(12) United States Patent
Rackliffe

(10) Patent No.: US 8,892,672 B1
(45) Date of Patent: Nov. 18, 2014

(54) DETECTING UNINTENDED RECIPIENTS OF ELECTRONIC COMMUNICATIONS

(71) Applicant: FMR LLC, Boston, MA (US)

(72) Inventor: Justin Rackliffe, Durham, NC (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 14/166,055

(22) Filed: Jan. 28, 2014

(51) Int. Cl.
*G06F 15/16* (2006.01)
*H04L 12/58* (2006.01)

(52) U.S. Cl.
CPC .................................... *H04L 51/30* (2013.01)
USPC ........................................................ 709/206

(58) Field of Classification Search
CPC ....................................................... H04L 51/12
USPC ................................................. 709/206–207
See application file for complete search history.

(56) References Cited

U.S. PATENT DOCUMENTS

| 6,970,908 | B1 | 11/2005 | Larky et al. |
| 7,574,349 | B2 | 8/2009 | Perronnin |
| 8,306,809 | B2 | 11/2012 | Hammer et al. |
| 2003/0200265 | A1* | 10/2003 | Henry ........................... 709/206 |
| 2008/0289037 | A1* | 11/2008 | Marman et al. .................. 726/22 |
| 2010/0088765 | A1* | 4/2010 | Lund et al. ...................... 726/22 |
| 2010/0100944 | A1* | 4/2010 | Fleming ........................... 726/4 |
| 2010/0318613 | A1* | 12/2010 | Souza et al. .................. 709/206 |
| 2012/0215861 | A1* | 8/2012 | Smith et al. ................... 709/206 |
| 2014/0074953 | A1* | 3/2014 | Piazza ........................... 709/206 |

* cited by examiner

*Primary Examiner* — Jason Recek
(74) *Attorney, Agent, or Firm* — Fish & Richardson P.C.

(57) ABSTRACT

A computer-implemented method, including receiving information indicative of a request to send an electronic communication to a recipient; executing by one or more computer systems one or more validation operations to determine whether the recipient is an intended recipient of the electronic communication by producing a validation score; determining, based on comparison of the validation score to a threshold value, that the recipient is an unintended recipient of the electronic communication; and when detecting the recipient as an unintended recipient, notifying the sender that the recipient is potentially an unintended recipient of the electronic communication prior to sending.

27 Claims, 9 Drawing Sheets

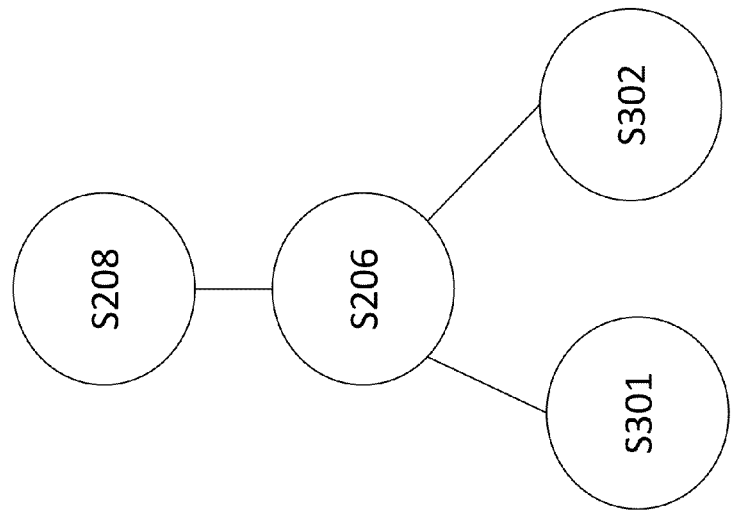
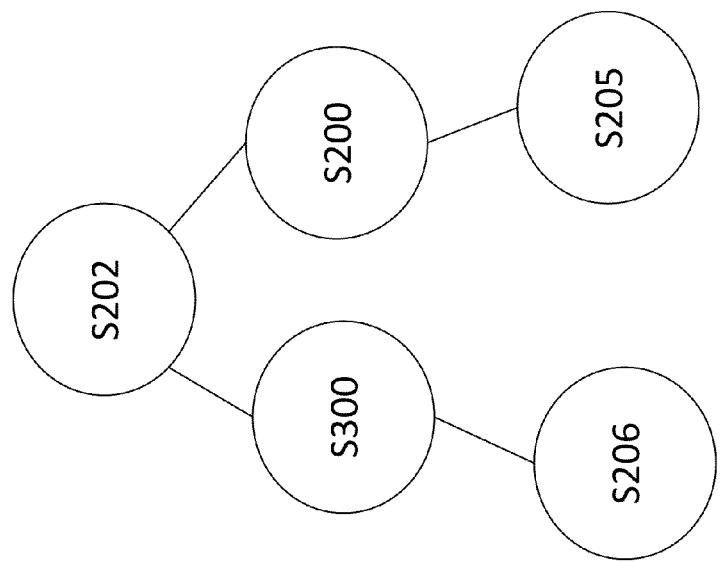
FIG. 2C

DETECTING UNINTENDED RECIPIENTS OF ELECTRONIC COMMUNICATIONS

BACKGROUND

Electronic correspondence, such as email, can create unintended information dissemination outside of an organization or delivery of information to unintended recipients within an organization.

SUMMARY

In some implementations, a method includes receiving information indicative of a request to send an electronic communication to a recipient; executing by one or more computer systems one or more validation operations to determine whether the recipient is an intended recipient of the electronic communication by producing a validation score; determining, based on comparison of the validation score to a threshold value, that the recipient is an unintended recipient of the electronic communication; and when detecting the recipient as an unintended recipient, notifying the sender that the recipient is the unintended recipient of the electronic communication. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Various implementations may include one or more of the following features and actions. In one implementation, the validation score is a recipient distance value, and wherein a validation operation comprises: accessing hierarchical information, with an item of hierarchical information representing an entity, with the hierarchical information representing relationships among entities, and with the recipient and a sender of the electronic communication being represented in the hierarchical information; identifying, in the accessed hierarchical information, a sender item of hierarchical information that represents the sender and a recipient item of hierarchical information that represents the recipient; calculating the recipient distance value between the sender item of hierarchical information that represents the sender and the recipient item of hierarchical information that represents the recipient; and determining, based on the recipient distance value, whether the recipient item of hierarchical information is an outlier with an increased amount of distance to the sender item of hierarchical information, relative to other distances of other items of hierarchical information to the sender item of hierarchical information.

In other implementations, the actions include determining whether the recipient item of hierarchical information is the outlier comprises: determining whether the recipient distance value exceeds a threshold distance value. The recipient distance value can be a weighted value, and wherein the method further comprises: identifying an edge in a graph between a node representing the user and a node representing the recipient; determining a weight associated with the edge; and calculating the recipient distance value based on the weight. The actions include when the recipient item of hierarchical information is a determined outlier: updating a graphical user interface that displays on a display device associated with the sender information indicative of a name of the recipient, with the updated graphical user interface causing the information indicative of the name of the recipient to change from a first color to a second color to notify the sender that the recipient could be the unintended recipient. The actions include when the recipient item of hierarchical information is not determined to be an outlier: causing the electronic communication to be sent to the recipient.

In still other implementations, the hierarchical information comprises one or more of: a global address list; Lightweight Directory Access Protocol information; and a social network graph of a social networking platform, wherein a node in the social network graph represents the sender and wherein another node in the social network graph represents the recipient. The recipient distance value comprises a degree of separation value. The hierarchical information comprises one or more of: information specifying an arrangement of nodes that specify users of a social networking platform and information specifying relationships among the nodes; and information specifying an arrangement of nodes that represents employees of an entity and information specifying a hierarchy of the nodes. A validation operation comprises: determining whether information representing the recipient is included in a pre-approved recipient list. A validation operation comprises: determining whether information representing the recipient is included in a list that specifies entities to whom the sender previously sent electronic communications. Notifying comprises: causing a sender of the electronic communication to be prompted to confirm sending of the electronic communication to the recipient or adjusting the color of the recipient to indicate the possible unintended party.

All or part of the foregoing may be implemented as a computer program product including instructions that are stored on one or more non-transitory machine-readable storage media and/or one or more machine-readable hardware storage devices that are executable on one or more processing devices. All or part of the foregoing may be implemented as an apparatus, method, or electronic system that may include one or more processing devices and memory to store executable instructions to implement the stated functions.

The details of one or more embodiments are set forth in the accompanying drawings and the description below. Other features, objects, and advantages of the techniques described herein will be apparent from the description and drawings, and from the claims.

DESCRIPTION OF DRAWINGS

FIGS. 2A-2C are graphs depicting hierarchies

DETAILED DESCRIPTION

A system consistent with this disclosure detects when a proposed recipient of an electronic communication is an unintended recipient. There are various types of electronic communications, including, e.g., electronic mail (e-mail) messages, sender text messages (SMS), Protocol Independent Multicast (PIM) messages, and so forth. Generally, an unintended recipient is a recipient that a sender of the electronic communication unintentionally, erroneously, and/or inadvertently selected to receive the electronic communication. Upon detection of an unintended recipient, the system notifies the sender that the recipient included on the electronic communication may not be the sender's intended recipient.

Figure 1:
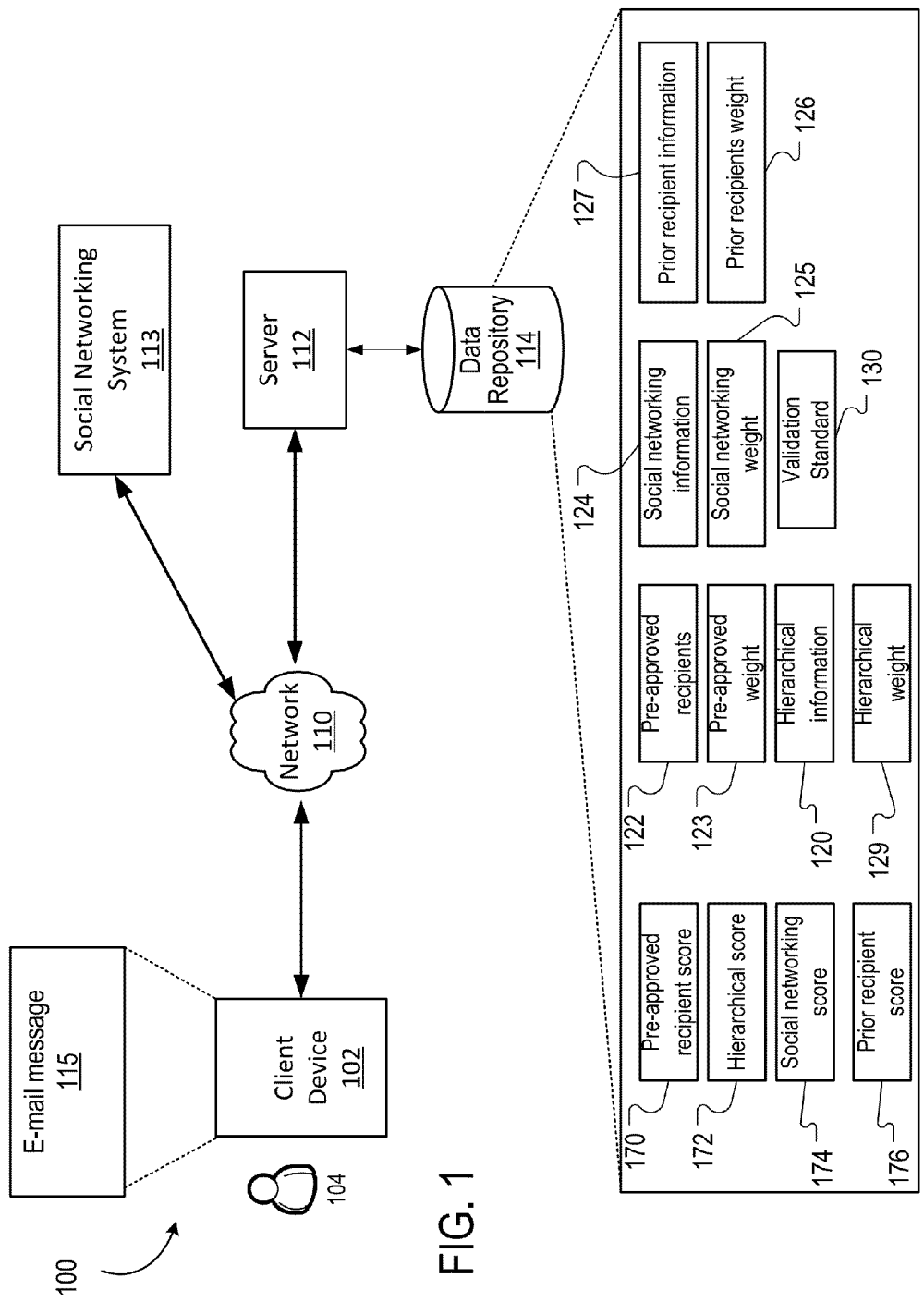
FIG. 1 is a diagram of a system for determining whether a recipient is an unintended recipient.

Referring now to FIG. 1, system 100 includes a client device 102, a network 110, a server 112, social networking system 113, and a data repository 114. Using information input by user 104, client device 102 generates electronic communication 115. The client device 102 and the server 112 communicate with each other over network 110 and can run programs having a client-server relationship to each other. Server 112 is associated with a particular company, e.g., a financial institution, organization, university, and so forth.

Electronic communication 115 includes information indicative of one or more recipients. Client device 102 transmits electronic message 115 to server 112. In response, server 112 analyzes contents of electronic communication 115 and executes validation operations to detect if one of more of the specified recipients are unintended recipients. Server 112 executes various validation operations in detecting unintended recipients, including, e.g., an operation to determine if a recipient is specified in a list of pre-approved recipients, an operation to determine if a recipient is socially connected in a social network to a sender of the electronic communication, an operation to determine if a recipient was previously sent another electronic communication by the sender, an operation to determine a degree of separation in an organizational structure between the sender and the recipient, and so forth.

In this example, server 112 obtains, from data repository 114, hierarchical information 120 pertaining to the user 104 and proposed recipients of the electronic communication 115. Generally, hierarchical information 120 includes a series of nodes that are arranged in a hierarchy, as further described in FIG. 2A. A node represents an entity (e.g., an individual, a group, a user, and so forth). In an example, the hierarchical information 120 pertains to an organization of a company, with each node representing an employee of the company. In this example, nodes representing a chief executive officer ("CEO") is arranged above nodes that represent mid-level management.

Server 112 also retrieves from data repository 114 pre-approved recipient information 122, including, e.g., information specifying one or more recipients that are specified by user 104 as being validated and/or pre-approved 122 for user 104 to transmit electronic communication. In an example, a pre-approved recipient is a contact of an email application or a contact who is saved in an address book. In another example, the pre-approved recipient information 122 includes recipients identified by an organization that employs user 104 or otherwise has an association with user 104. Server 112 also retrieves from data repository 114 (and/or from social networking system 113) social networking information 124, including, e.g., information indicative of one or more users of social networking system 113 who are socially connected to user 104 in the social networking system. In an example, server 112 retrieves from social networking system 113 (in real-time and upon receipt of email message) social networking information 124 and stores social networking information 124 in data repository 114. In a variation, data repository 114 is an optional component that provides server 112 with an application programming interface (API) for real-time analysis.

System 112 also retrieves a list of prior recipient information 127, including, e.g., information specifying one or more recipients of electronic communications that are sent by user 104. System 112 tracks electronic communications that are sent by user 104 and stores in data repository 114 the list of recipients 127 who previously received electronic communications from user 104. As described in further detail below, the server 112 uses the pre-approved recipient information 122, social networking information 124, prior recipient information 127 and hierarchical information 128 in validating a proposed recipient of the electronic communication 115.

Hierarchical information 120 generally includes information obtained from a directory, e.g., a global address list ("GAL"), a lightweight directory access protocol ("LDAP"), an application programming interface ("API"), and an organization chart. For example, the GAL provides information pertaining to the recipient, e.g., e-mail, title, name, members of a distribution group, and the organization chart provides information pertaining to the relationship between the sender and the recipient. In this example, the sender and the recipient each represent a node and their relationship to each other is represented by their connections, e.g., edges, as defined by the organization chart. In another example, the LDAP protocol information includes information pertaining to the recipient and organizational information pertaining to the relationship between the sender and the recipient. In this example, server 112 retrieves the organization information from internal systems and parses the organization information to determine hierarchical information.

The hierarchical information 120 is stored in data repository 114. This organization information represents the relationship between the sender, e.g., user 104, and an original recipient. A node corresponds to a member of the organization with an edge showing the connection between the two members. Using hierarchical information 120, server 112 determines a recipient distance value, including, e.g., information specifying the degrees of separation in a graph (e.g., a social network graph, an organizational graph, and so forth) between the node representing the sender of the electronic communication, e.g., the user 104, and the node representing an original recipient of the electronic communication. Using the recipient distance value, server 112 detects whether an email recipient that is an outlier, e.g., a recipient associated with a recipient distance value that exceeds a threshold value, which is customizable by an administrator of the system. For example, an outlier indicates a recipient distance value that is beyond the acceptable threshold value, as defined by a validation standard 130, established by the organization and/or the sender. In this example, recipient distance value is calculated as the shortest path between two nodes, e.g., the node representing the sender and the node representing the recipient in an organization chart In an example, co-workers designated in groups of which the user 104 is a member will have a lower recipient distance value than those not associated with the user 104. For example, a direct supervisor of the user 104 will have a recipient distance value of one with respect to the user 104. In another example, group members, e.g., co-workers directly supervised by a direct supervisor of user 104, will have a recipient distance value of two with respect to the user 104. In yet another example, co-workers in a group supervised by a supervisor not associated with the user 104 will have a recipient distance value of at least three with respect to the user 104.

Server 112 retrieves social networking information 124 of the user 104 from social networking system 113 through the application programming interface ("API") of social networking system 113. The social networking information 124 includes a social graph with a series of nodes that are arranged to represent relationships and/or social connections between the sender and members of the specific social network. A node corresponds to a user in the social network with an edge showing the connection between the two users. The server 112 uses data acquired from the social graph to calculate the degrees of separation between the user 104 and an original recipient of electronic communication 115. For example, social networking system defines connections between nodes representing users as friendships. If the user 104 and the original recipient are friends in social networking system 113, there is a direct connection between the user and the recipient and thus one degree of separation.

Using pre-approved recipient information 122, server 112 generates various validation scores that are used in validating the recipient as an intended recipient. The validation scores include pre-approved recipient scores, hierarchical scores, social networking scores and prior recipient scores. Pre-approved recipient score 170 includes a value that specifies whether a recipient of email message 115 is included in pre-approved recipient information 122. Pre-approved recipient score 170 has a Boolean value of either one or zero. A value of zero specifies that a recipient is not included in the pre-approved recipient information 122. A value of one specifies that a recipient is included in the pre-approved recipient information 122.

Using hierarchical information 120, server 112 generates hierarchical score 172, e.g., the recipient distance value that specifies the number of degrees of separation in hierarchical information 120 between a node representing user 104 and a node representing the recipient of electronic communication 115. Hierarchical score 172 can have various values, including, e.g., a value of one to indicate one degree of separation, a value of two to indicate two degrees of separation, and so forth.

In a variation, the hierarchical score 172 is a weighted value, based on weights associated with an edge between nodes in the hierarchical information. For example, in an organization that has a flat structure, meaning relatively few levels compared to highly structure organizations with many levels as exemplified in organization charts, the recipient distance value between the user 104 and a high level supervisor, e.g., a chief executive officer ("CEO"), may be low. In this example, the edge connections between the user 104 and the high level supervisor is weighted.

There are various ways in which server 112 determines the weight values for particular hierarchical information. In an example, a user of server 112 assigns validation weights to pre-approved recipients, social network connections, previous correspondents, and remote colleagues in a hierarchy. In another example, server 112 retrieves, from an external system (not shown), weight values for various types of hierarchical information.

Figure 2A:
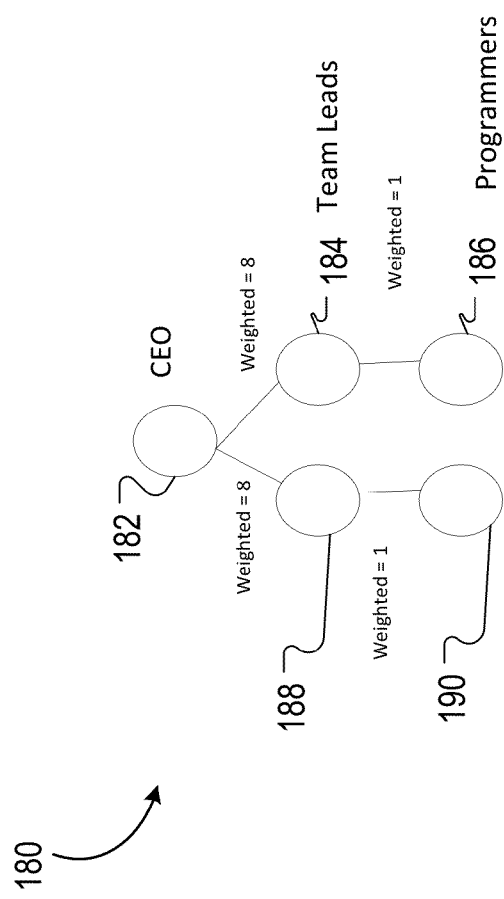

Referring to FIG. 2A, visual representation 180 of hierarchical information includes nodes 182, 184, 186, 188, 190. Node 182 represents the CEO of an organization. Nodes 184, 188 represent team leads of the organization. Nodes 186, 190 represent programmers in the organization. The edge between node 182 and each of nodes 184, 188 is associated with a weighted value of eight to specify that a team lead has a decreased likelihood of wanting to contact the CEO, relative to the likelihood of a team lead wanting to contact a programmer—even though the team lead is one degree of separation away from both the CEO and the programmer. As described in further detail below, the inverse of the number of degrees of separation is used in validating a recipient as an intended recipient of an electronic communication. The edge between node 188 and node 190 is associated with a weighted value of one to specify that a team lead has an increased likelihood of wanting to contact a programmer, relative to the likelihood of a team lead wanting to contact the CEO.

Using social networking information 124, server 112 generates social networking score 174, e.g., a value that specifies whether a recipient of email message 115 is socially connected to user 104 in social networking platform 113. Social networking score 174 has a Boolean value of either one or zero. A value of one specifies that a recipient is socially connected to user 104. A value of zero specifies that a recipient is not socially connected to user 104.

In another example, social networking score 174 has an absolute value that is indicative of a number of degrees of separation in social networking platform 113 between a node representing user 104 and a node representing the recipient of electronic communication 115. In this example, a value of one for social networking score 174 specifies that user 104 and the recipient of electronic message 115 have one degree of separation and are friends. In this example, a value of two for social networking score 174 specifies that user 104 and the recipient of electronic message 115 have two degrees of separation and are friends-of-friends in social networking platform 113.

Using prior recipient information 127, server 112 generates prior recipient score 176, e.g., a value that specifies whether a recipient of email message 115 has previously been the recipient of an electronic communication sent by user 104. Prior recipient score 176 has a Boolean value of either one or zero. A value of one specifies that a recipient is a prior recipient. A value of zero specifies that a recipient is not a prior recipient.

Server 112 also retrieves weights 123, 125, 126, and 129 for pre-approved recipient score 170, hierarchical score 172, social networking score 174, and prior recipient score 176, respectively. Generally, a weight is a value specifying an importance of an item of information relative to importance of other items of information. Server 112 applies the respective weights 123, 125, 126, and 129 to pre-approved recipient score 170, hierarchical score 172, social networking score 174, and prior recipient score 176, respectively, in determining whether a recipient of electronic communication 115 is an unintended recipient.

Server 112 receives from user 104 information specifying values for weights 123, 125, 126, and 129. The user 104 specifies values for weights 123, 125, 126, and 129, based on preferences of the user. In an example, the user 104 perceives pre-approved recipients as being a particularly strong validation factor, e.g., relative to the perceived strength of other types of hierarchical information. The user specifies an increased value for weight 123 for a recipient identified as a pre-approved recipient 122, relative to the values specified for weights 125, 126, and 129. In another example, the user perceives organizational and hierarchical information as being a particularly strong validation factor, e.g., relative to the perceived strength of other types of hierarchical information. The user specifies an increased value for weight 129 for a recipient having a low recipient distance value.

Server 112 also stores, in data repository 114, validation standard 130. The validation standard 130 specifies parameters and/or thresholds for identifying an unintended recipient and an intended recipient. Generally, an intended recipient is a recipient that server 112 confirms as being correctly specified by a user. When the various scores satisfy the validation standard, server 112 determines that an original recipient of electronic communication 115 is an intended recipient. When the validation information fails to satisfy the validation standard, server 112 determines that the original recipient of the electronic communication 115 is an unintended recipient and notifies the sender of the possibility of an unintended recipient. The validation standard may include any combination of the below described standards that are implemented in any order.

In an example, the validation standard 130 indicates that a recipient identified as a pre-approved recipient is automatically validated, e.g., when the pre-approved recipient score has a value of one. In another example, when the social networking score 174 is a Boolean value, the validation standard 130 indicates that when the social networking score 174 has a value of one that an original recipient is validated as an intended recipient. When the social networking score 174 is an integer value based on the degrees of separation between user 104 and a recipient in social networking platform 113, server 112 determines that when recipient distance value between a node representing user 104 and a node representing the recipient exceeds a threshold value that the proposed recipient is an unintended recipient.

In yet another example, the validation standard 130 indicates that a recipient identified as a prior recipient of electronic correspondence is automatically validated, e.g., when the prior recipient score has a value of one. In certain cases, recipients identified as frequent and prior recipients of electronic correspondence are automatically validated. In this example, a frequent recipient of electronic correspondence is a recipient who has received electronic correspondence at least twice. When server 112 determines that a recipient is not a prior recipient, server 112 may still validate the recipient by determining whether the recipient is a pre-approved recipient and/or has a recipient distance value (as specified in social networking information or hierarchical information) that is less than a threshold value.

In another example, the validation standard 130 indicates that when the hierarchical score 173 (e.g., recipient distance value between nodes in hierarchal information) is above a threshold value that the proposed recipient is an outlier or unintended recipient. Upon detection of the unintended recipient, server 112 notifies user 104 of the potential of an unintended recipient. When the hierarchical score 172 is less than the threshold value, server 112 may either validate the recipient as an intended user or may proceed to execute additional validation operations (such as determining whether the recipient is a pre-approved recipient, is a prior recipient, is socially connected to the user, and so forth).

In still another example, validation standard 130 specifies that a user is validated as an intended user when an aggregate validation score exceeds a threshold value. An aggregate validation score is a value based on at least two of validation scores. There are various ways in which server 112 determines the validation weight values for particular hierarchical information. In an example, a user of server 112 assigns validation weights to pre-approved recipients, social network connections, previous correspondents, and remote colleagues. In another example, server 112 retrieves, from an external system (not shown), validation weight values for various types of hierarchical information. Server 112 validates whether a recipient is an intended recipient based on pre-approved recipient score 170, hierarchical score 172, social networking score 174, prior recipient score 176 and associated weights, as shown in the below Table 1:

TABLE 1

| Aggregate Validation Score = | (Hierarchical Weight) (1/Hierarchical Score) + (Pre-approved Weight) (Pre-approved Recipient Score) + |

TABLE 1-continued

| | (Social Networking Weight) (Social Networking Score) + (Prior recipient weight) (Prior Recipient Score) |

As shown in the above Table 1, server 112 computes an aggregate validation score by applying an additive mathematical operation to the product of the hierarchical weight and the inverse of the hierarchal score, the product of the pre-approved weight and the pre-approved recipient score, the product of the social networking weight and the social networking score and the product of the prior recipient weight and the prior recipient score. Although the example in Table 1 is provided with an additive mathematical operation, other mathematical operations could be used.

When server 112 validates a recipient (as being an intended recipient), server 112 enables transmittal of electronic communication 115 to the recipient. In an example, server 112 validates a recipient when the aggregate validation score exceeds a threshold value. When server 112 is unable to validate a recipient (as being an intended recipient), server 112 notifies the user that a recipient is an unintended recipient and prompts the sender for instructions on how to proceed, as described in further detail below.

Figure 2B:
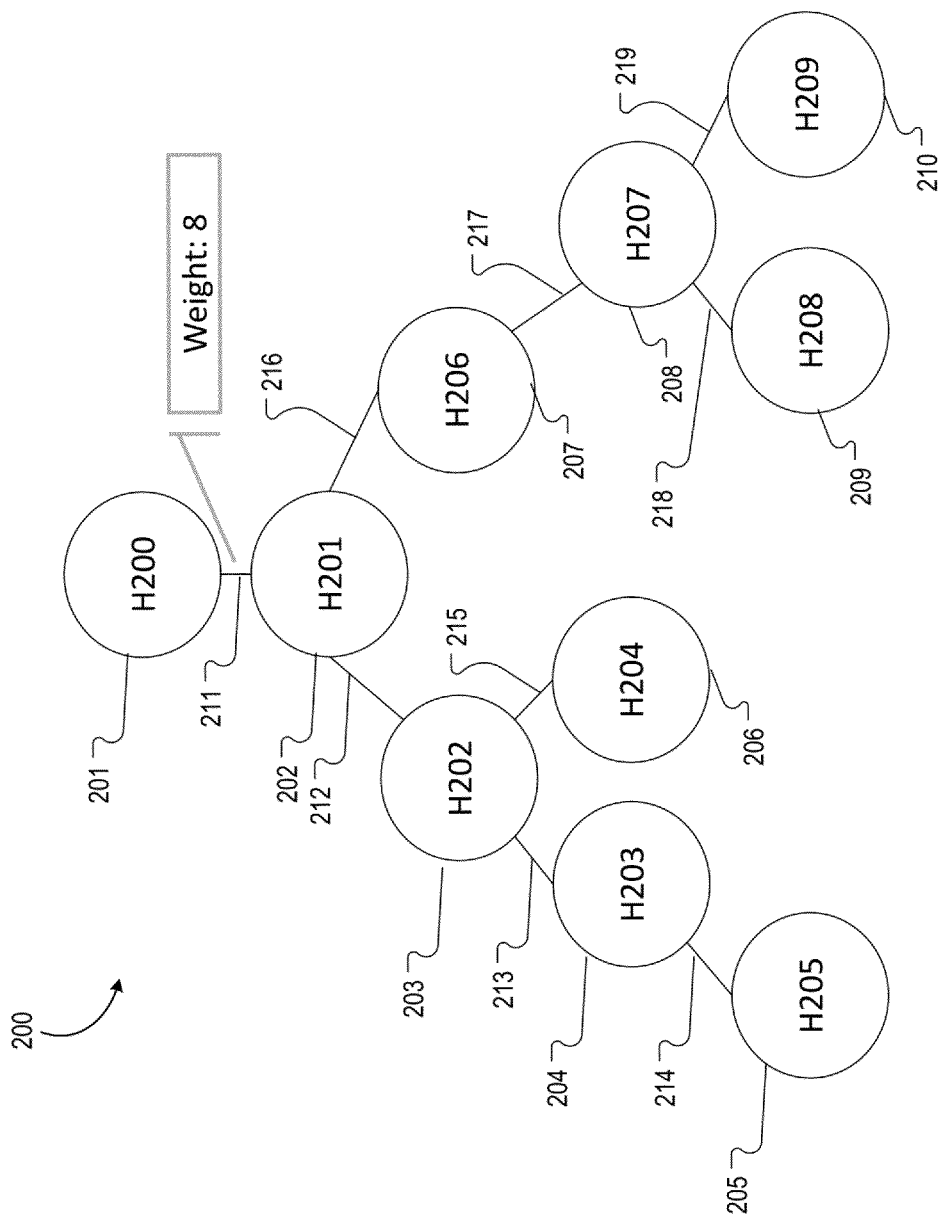

Referring to FIG. 2B, hierarchy 200 (e.g., a graph of an organization hierarchy) includes various nodes 201-210 that represent entities (e.g., individuals and/or employees) in an organization (e.g., a company). Edges 211-219 between nodes 201-210 represents relationships between the various nodes. An edge between two nodes represents a distance of one, e.g., one degree of separation. In some examples, an edge may be associated with a weighted value (e.g., weighted) to specify an increased amount of likelihood that a user represented by one node erroneously and/or unintentionally contacts another user represented by another node. As described below, hierarchy 200 may be used for analyzing potential unintended recipients of inter-office and/or inter-organizational communications.

Referring to FIG. 2C, graphs 220, 240 represent social networks. In this example, graph 220 includes nodes 221-225 that represent users of the social network and edges 226-229 to represent relationships among the users. In an example, an edge may be weighted to specify an increased likelihood that a user of the social graph is erroneously contacting another user of the social graph. Graph 240 includes nodes 241-244 that represent users of the social network and edges 245-247 to represent relationships among the users.

In FIGS. 2B and 2C, the numbers inside the nodes represent a particular person. For example, in FIG. 2B, H202 represents a particular individual. In FIG. 2C, the numbering inside the nodes also represent particular people, such that the same number scheme in FIG. 2B as in FIG. 2C represents the same person. For example, the "H" in H202 in FIG. 2B specifies a representation of the person specified as person "202" in an organizational hierarchy ("H"). In FIG. 2C, the same person is represented as S202, with the "S" specifying that it is the representation of the person represented as 202 in a social hierarchy.

As previously described, server 112 determines whether a recipient of an electronic message is an unintended recipient based on various factors, e.g., distance between the sender and the recipient in an organization hierarchy, distance between the sender and the recipient in a social graph, whether the sender has previously corresponded with the recipient, whether the recipient is an established contact of the sender (e.g., whether the recipient is included in an address book of the sender) and so forth.

Server 112 implements various rules and operations to determine whether a recipient is an unintended recipient, in accordance with the algorithm shown below.

| | |
|---|---|
| $D_{hierarchyN}$ = | Degree of Separation in Hierarchies |
| $W_{hierarchyN}$ = | Weighted modifier |
| $D_{socialN}$ = | Degree of Separation in Social Networks |
| $W_{socialN}$ = | Weighted Modifier |
| $D_{threshold}$ = | Administrator defined threshold for notification |
| $B_{history}$ = | Boolean representative of prior communication with recipient |
| $B_{preapproved}$ = | Boolean representative of an established contact |
| Min = | A minimum function |
| Notification = | $(Min(W_{hierarchy1} *D_{hierarchy1}, W_{social1} *D_{social1}, \ldots ) > D_{threshold} )$ && $!(B_{history} \| B_{preapproved})$ |

As shown above, server 112 executes an algorithm (e.g., a series of rules) that specifies that a user is notified that a recipient is an unintended recipient when the following condition is satisfied: $(Min(W_{hierarchy1}*D_{hierarchy1}, W_{social1}*D_{social1}, \ldots )>D_{threshold})$ && $!(B_{history}\|B_{preapproved})$. The notification during the send request leverages both relational and logical operations. Primary check is around the set of social graph sources providing weighted degrees of separation providing a base likelihood of relationship (e.g., $(W_{hierarchy1}*D_{hierarchy1}, W_{social1}*D_{social1}, \ldots ))$. This primary check is then logically compared with historical or user configured sources (e.g., $!(B_{history}\|B_{preapproved}))$. In this example, server 112 generates a notification when a minimum value of hierarchical degrees of separation exceeds a threshold degree of separation (e.g., $Min(W_{hierarchy1}*D_{hierarchy1}, W_{social1}*D_{social1}, \ldots ))$ and when the recipient is either not an established contact of the sender or the sender has not had prior communication with recipient (e.g., $!(B_{history}\|B_{preapproved}))$. In an example, when server 112 generates a notification server 112 also logs and journals the "flagged" content for review by an organization to better support organizational firewalls and data loss prevention.

Figure 3:
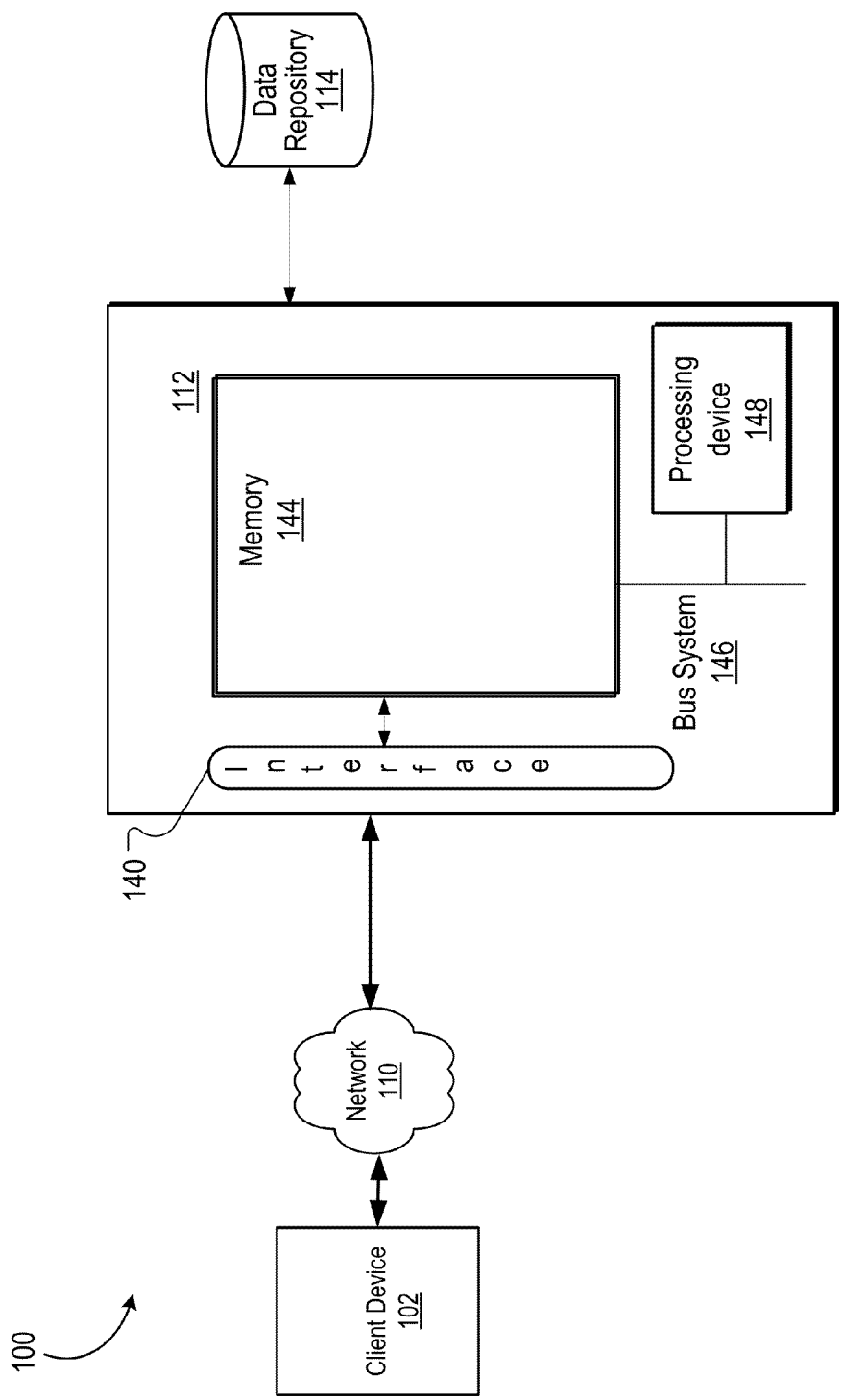
FIG. 3 is a block diagram of components of a system for determining whether a recipient is an unintended recipient.

FIG. 3 is a block diagram of components of system 100. In FIG. 3, client device 102 can be any sort of computing devices capable of taking input from a user and communicating over network 110 with server 112 and/or with other client devices. For example, client device 102 can be mobile devices, desktop computers, laptops, cell phones, personal digital assistants ("PDAs"), iPhone, smart phones, iPads, servers, embedded computing systems, and so forth.

Server 112 also includes memory 144, a bus system 146, and a processor 148. Memory 144 can include a hard drive and a random access memory storage device, such as a dynamic random access memory, machine-readable media, machine-readable hardware storage devices, or other types of non-transitory machine-readable storage devices. A bus system 146, including, for example, a data bus and a motherboard, can be used to establish and to control data communication between the components of server 112. Processor 148 may include one or more microprocessors and/or processing devices. Generally, processor 148 may include any appropriate processor and/or logic that is capable of receiving and storing data, and of communicating over a network (not shown).

Server 112 can be any of a variety of computing devices capable of receiving data, such as a server, a distributed computing system, a desktop computer, a laptop, a cell phone, a rack-mounted server, and so forth. Server 112 may be a single server or a group of servers that are at a same location or at different locations. The illustrated server 112 can receive data from client devices 102 via input/output ("I/O") interface 140. I/O interface 140 can be any type of interface capable of receiving data over a network, such as an Ethernet interface, a wireless networking interface, a fiber-optic networking interface, a modem, and so forth.

In a variation, the operations described herein may be performed client-side, e.g., on client device 102. In this example, client device 102 may download from server 112 (via network 110) an application that is executable on client device 102 to perform the operations described herein for determining when a recipient of an electronic communication is potentially an unintended recipient.

Figure 4:
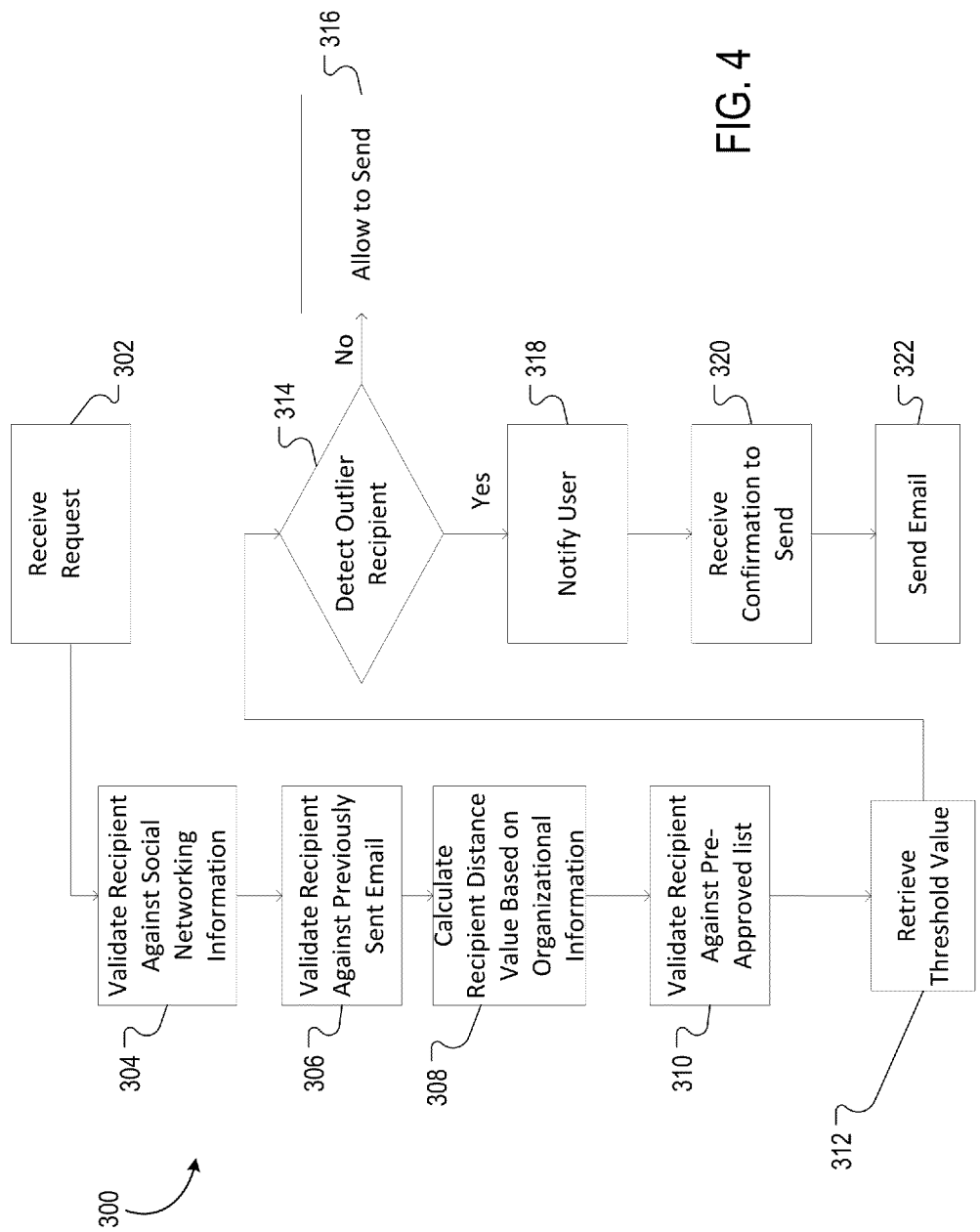
FIG. 4 is a flow chart of processes executed by a system for determining whether a recipient is an unintended recipient.

Referring now to FIG. 4, server 112 implements process 300 to determine whether a proposed recipient is an outlier, e.g., by generating an aggregate validation score and determining whether the aggregate validation score exceeds a threshold. In this example, server 112 receives (302) and evaluates the request to send an electronic communication for a proposed recipient, e.g., a recipient listed in the "to" field of an electronic communication, the "cc" (carbon copy) field of an electronic communication, the "bcc" (blind carbon copy) field of an electronic communication.". In operation, server 112 validates (304) the proposed recipient against social networking information. For example, a proposed recipient that is associated with the sender in a social networking platform is validated, e.g., by validating that the sender and the recipient are socially connected in the social networking platform, by validating that the sender and the recipient are each members of the same social networking platform and so forth. In this example, the external system is a professional virtual network (e.g., LinkedIn®) and an association is a connection between two nodes in a network graph, with a node represent a user of the professional virtual network. In another example, the external system is a social network (e.g., Facebook) and an association is a social connection (e.g., "friendship") between two nodes in a social graph of the social network, with a node in the social graph representing a user of the social network. Based on the validation, server 112 generates a social networking score.

Server 112 also validates (306) the proposed recipient against the sender's prior recipients of electronic correspondence (e.g., previously sent emails). In this validation operation, server 112 generates a prior recipient score. Server 112 also calculates (308) a hierarchical score (e.g., a recipient distance value) based on hierarchical information, e.g., an organization chart. Server 112 also validates (310) the proposed recipient against a pre-approved list and generates a pre-approved recipient score based on the results of the validation. For example, server 112 validates a proposed recipient that is designated as a pre-approved recipient. The pre-approved list is established and/or updated by the sender and/or the organization.

Server 112 applies (not shown) weighted values to one or more of the pre-approved recipient score, the hierarchical score, the social networking score and the prior recipient score. Server 112 applies one or more mathematical operations to the weighted and the pre-approved recipient score, the hierarchical score, the social networking score and the prior recipient score to generate the aggregate validation score, as shown in the above Table 1. Server 112 retrieves (312) from data reposition 114 a pre-determined threshold value (that is stored as part of the threshold standard).

To evaluate the relationship between the sender and the proposed recipient, server 112 compares (310) the aggregate validation score with a pre-determined threshold value, as defined by the validation standard.

Server 112 detects (314) if a proposed recipient is an outlier recipient by comparing the aggregate validation score to the predetermined threshold values. In a variation of FIG. 3, server 112 detects if a proposed recipient is an outlier by comparing at least one of the validation results and/or the recipient distance value with the validation standard. An outlier recipient includes a recipient associated with a validation score that fails to satisfy a threshold value and is thus indicative of the recipient being an unintended recipient.

If the proposed recipient fails to satisfy the criteria as defined by the validation standard (e.g., the aggregate validation score is less than the threshold value), the proposed recipient is categorized as an outlier. If the proposed recipient is not an outlier, server 112 allows (316) the electronic correspondence to be sent to the recipient. If an outlier is detected, server 112 notifies (318) the user that an outlier is detected. This notification includes a modal notification. In another example, this notification includes a change in color in the display of the electronic correspondence of the names of the recipients that are determined to be outliers. Server 112 receives (320), from a client device associated with the sender, confirmation to send the electronic communication and server 112 sends (322) the electronic communication. Confirmation is actively provided by the user, e.g., by positive confirmation in a modal dialog box. In another example, confirmation is inferred based on the sender's action despite the user interface change. In this example, the user is notified by the change in color in the address fields and proceeds with sending the electronic communication anyway. Execution of process 300 provides an indication of a possibility that a recipient is an unintended recipient.

Figure 5:
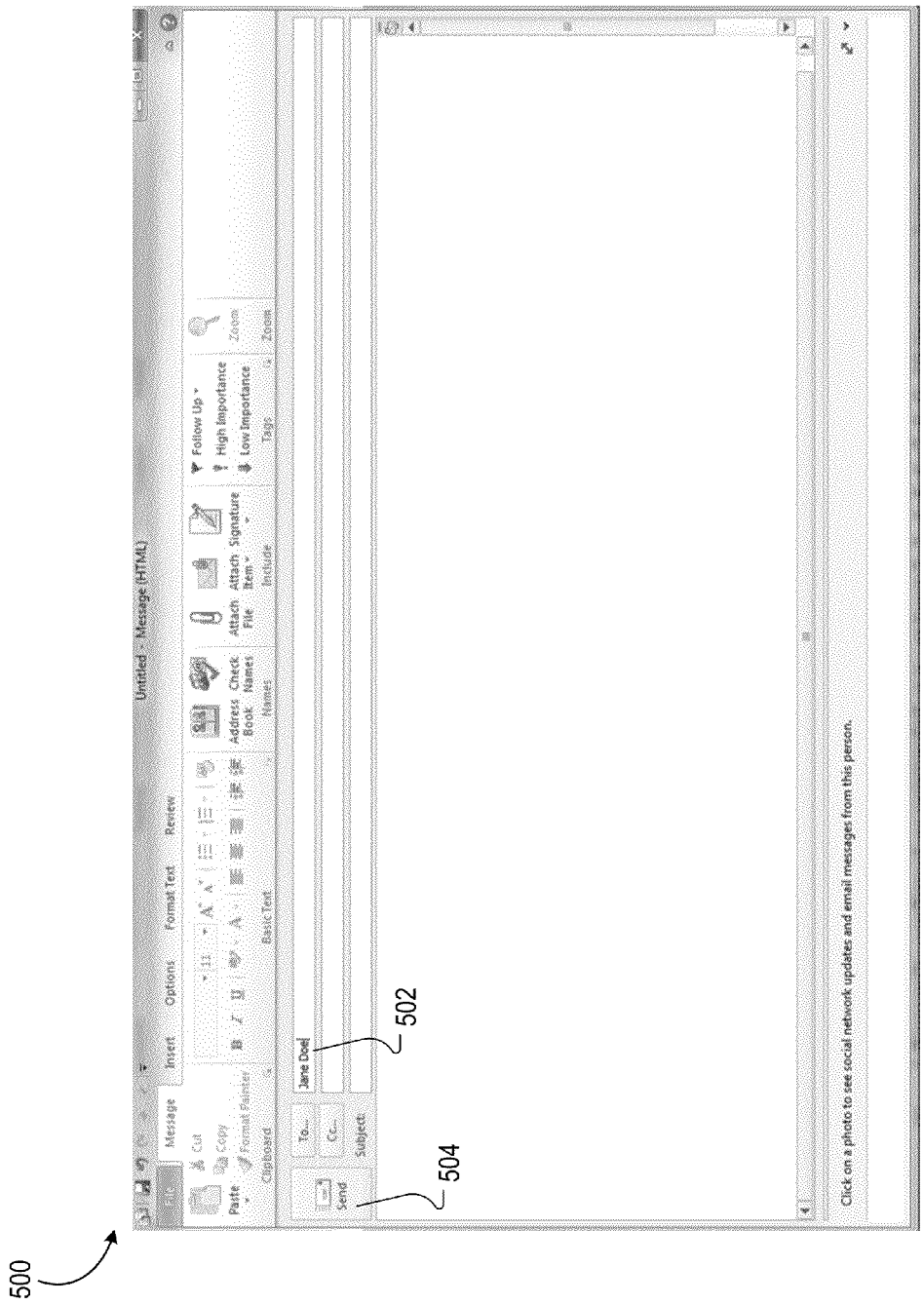
FIGS. 5 and 6 are screen images of graphical user interfaces for displaying an email message.
Figure 6:
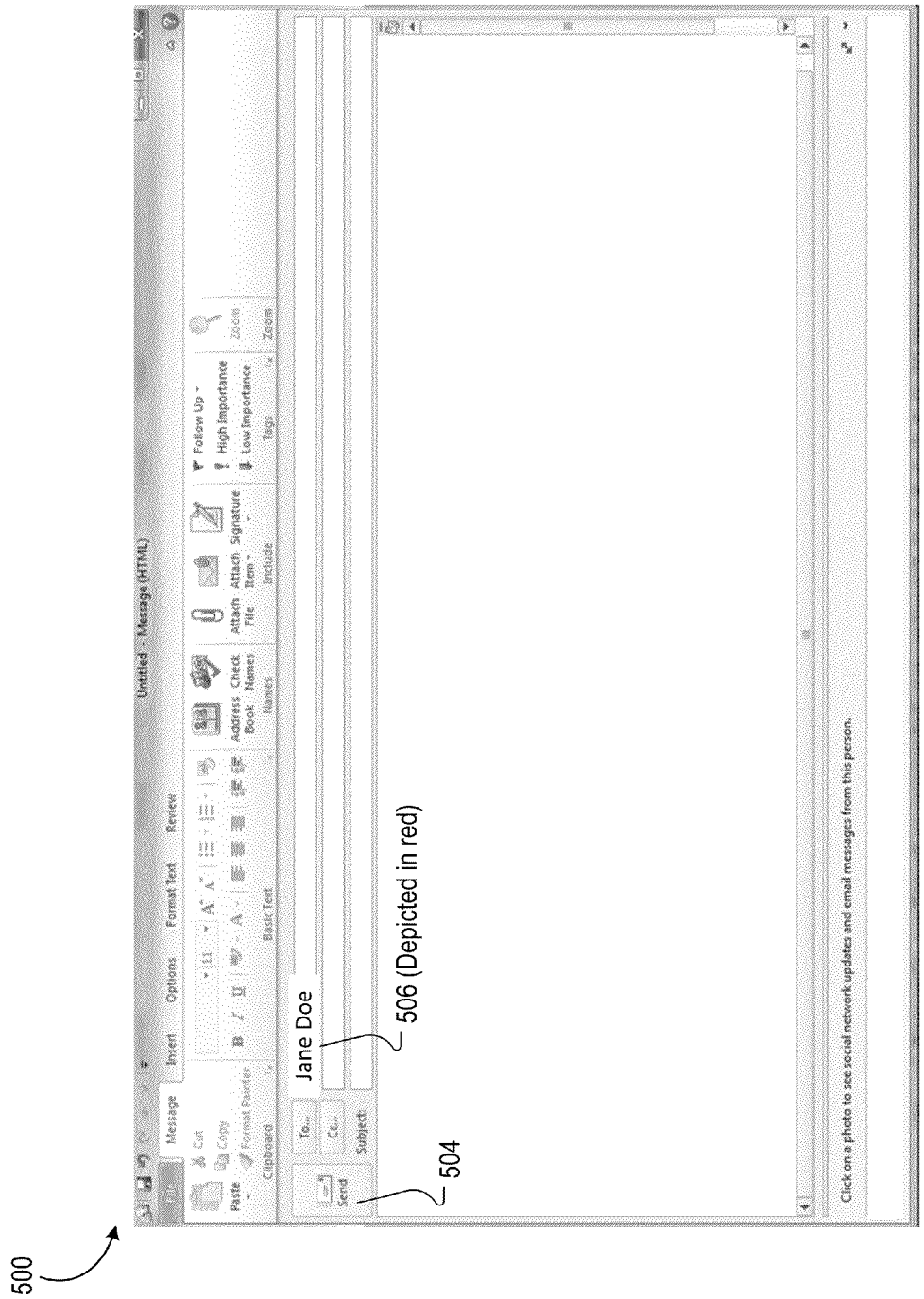

Referring now to FIG. 5, graphical user interface 500 is displayed on a display device of a client device of a user who is drafting an email. In this example, the client device is in communication with server 112. Graphical user interface 500 includes recipient portion 502, e.g., a portion that displaying information specifying a recipient of the email. While drafting the email, text ("Jane Doe") displayed in recipient portion is a first color (e.g., the color black). The user selects send button 504 to cause the email message to be sent to server 112 for analysis. Upon detecting that the recipient is an unintended recipient, server 112 sends back to the client device instructions to change the color of the text in the recipient portion 502 to another color (e.g., red) to notify the user that the recipient is an unintended recipient, as shown in FIG. 6. In a variation, a client device on which the email is composed may include software and/or an application to perform the operations described herein to detect whether a proposed recipient is an unintended recipient.

Referring to FIG. 6, recipient portion 506 is depicted in red to specify that the recipient ("Jane Doe") may be an unintended recipient. If the user detects that the recipient is incorrect, the user enters a new recipient in recipient portion 506. If the user detects that the recipient is correct, the user selects send button 504 to confirm that the recipient is correct and to transmit the mail to the recipient.

Figure 7:
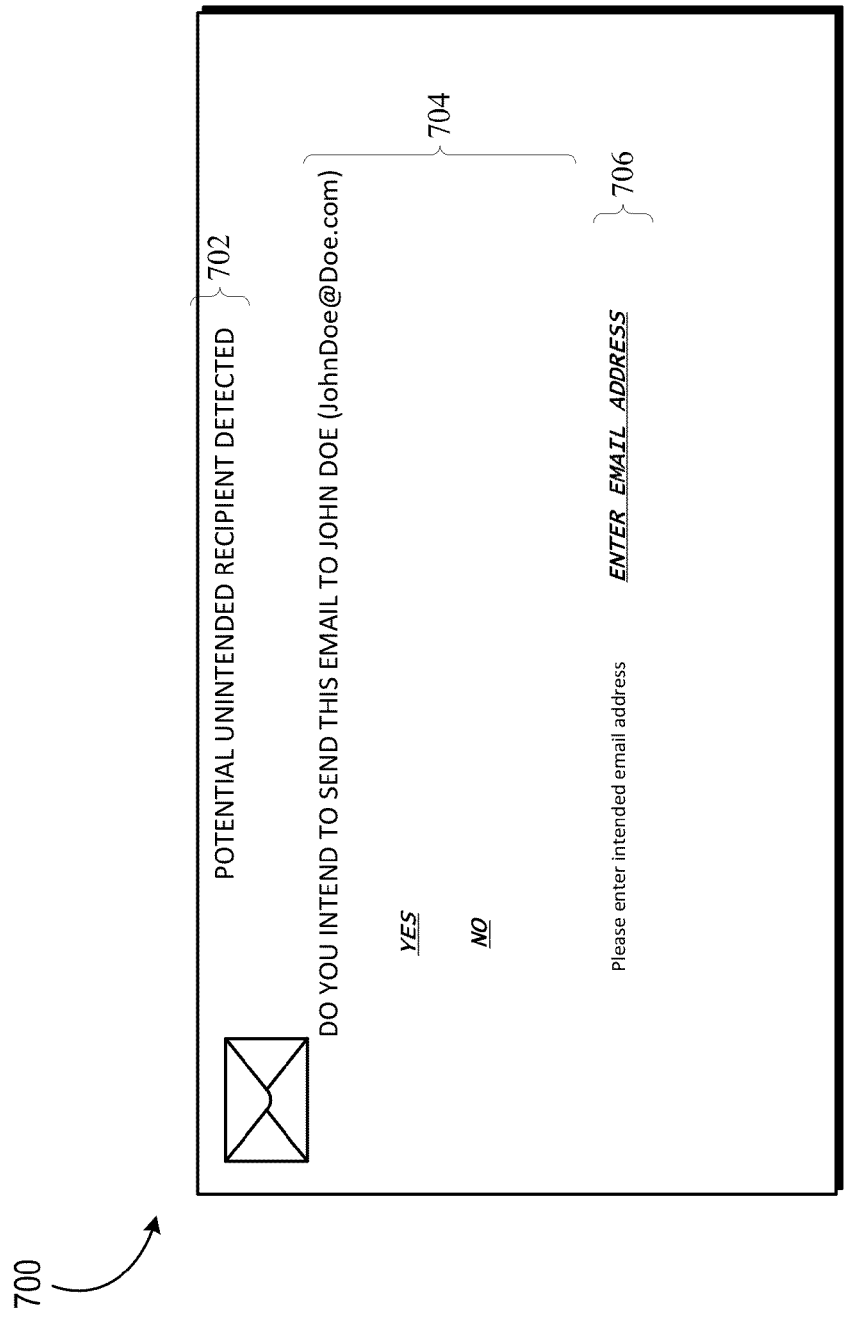
FIG. 7 is a screen image of a graphical interface generated by a system for determining whether a recipient is an unintended recipient.

Referring to FIG. 7, server 112 generates information for a graphical user interface 700 to notify the user that a proposed recipient of an electronic communication is an outlier and to request confirmation for how to proceed. Graphical user interface 700 is a modal dialog box that is displayed as an overlay on another graphical user interface (e.g., a graphical user interface that allows a user to draft contents of an electronic message). Graphical user interface 700 includes a notification message 702, a confirmation request portion 704, and a substitute recipient portion 706. Various other types of mechanisms, such as check boxes, drop-down boxes, and the like, may be used to allow a user to selection options for a given input field. Generally, graphical user interface 700 includes a modal dialog box 701 that remains on the display until the user has entered the requested information. For example, the modal dialog box remains on the screen until the user characterizes the proposed recipient as an intended recipient by clicking "Yes" or as an unintended recipient by clicking "No." When the user specified that the proposed recipient is an intended recipient, via selection of "Yes" in confirmation request portion 704, server 112 transmits the electronic communication to a device associated with the recipient.

In this example, if the proposed recipient is an unintended recipient (as indicated by the sender selecting "No" in confirmation request portion 704), the graphical user interface 700 remains open and permits the user to submit in substitute recipient portion 706 the correct e-mail address of the user's intended recipient. In an example, the entry of a substitute email address automatically signifies that the proposed recipient was unintended. Server 112 stores a record of all confirmed unintended recipients. Prior unintended recipients are used as another validation factor, in addition to and/or in combination with the above-described validation factors. For example, recipients that are confirmed being unintended at least a pre-determined number of times are automatically identified as unintended recipients.

Graphical user interface 700 can further include a field (not shown) through which the user can instruct the server 112 to add the potential unintended recipient to the pre-approved recipient list. The receipt of instructions to add the user to the pre-approved recipient list also serves as confirmation that the user intended to send the email to the proposed recipient.

Embodiments can be implemented in digital electronic circuitry, or in computer hardware, firmware, software, or in combinations thereof. Apparatus can be implemented in a computer program product tangibly embodied or stored in a machine-readable storage device for execution by a programmable processor; and method actions can be performed by a programmable processor executing a program of instructions to perform functions by operating on input data and generating output. The techniques described herein can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language.

Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD_ROM disks. Any of the foregoing can be supplemented by, or incorporated in, ASICs (application-specific integrated circuits).

Other embodiments are within the scope and spirit of the description claims. Additionally, due to the nature of software, functions described above can be implemented using software, hardware, firmware, hardwiring, or combinations of any of these. Features implementing functions may also be physically located at various positions, including being distributed such that portions of functions are implemented at different physical locations. The use of the term "a" herein and throughout the application is not used in a limiting manner and therefore is not meant to exclude a multiple meaning or a "one or more" meaning for the term "a." Additionally, to the extent priority is claimed to a provisional patent application, it should be understood that the provisional patent application is not limiting but includes examples of how the techniques described herein may be implemented.

A number of embodiments have been described. Nevertheless, it will be understood that various modifications may be made without departing from the spirit and scope of the claims and the examples of the techniques described herein.

What is claimed is:

1. A computer-implemented method, comprising:
receiving information indicative of a request to send an electronic communication to a recipient;
executing by one or more computer systems one or more validation operations to determine whether the recipient is an intended recipient of the electronic communication by producing a validation score, wherein the validation score is a recipient distance value and at least one of the one or more validation operations comprises:
accessing hierarchical information, with an item of hierarchical information representing an entity, with the hierarchical information representing relationships among entities, and with the recipient and a sender of the electronic communication being represented in the hierarchical information;
identifying, by one or more computer systems in the accessed hierarchical information, a sender item of hierarchical information that represents the sender and a recipient item of hierarchical information that represents the recipient;
calculating by the one or more computer systems the recipient distance value between the sender item of hierarchical information that represents the sender and the recipient item of hierarchical information that represents the recipient;
determining, by the one or more computer systems based on the recipient distance value, whether the recipient item of hierarchical information is an outlier with an increased amount of distance to the sender item of hierarchical information, relative to other distances of other items of hierarchical information to the sender item of hierarchical information;
determining, based on comparison of the validation score to a threshold value, that the recipient is an unintended recipient of the electronic communication; and when detecting the recipient as an unintended recipient,
notifying the sender that the recipient is the unintended recipient of the electronic communication.

2. The computer-implemented method of claim 1, wherein determining whether the recipient item of hierarchical information is the outlier comprises:
determining whether the recipient distance value exceeds a threshold distance value.

3. The method of claim 1, wherein the recipient distance value is a weighted value, and wherein the method further comprises:
identifying an edge in a graph between a node representing the user and a node representing the recipient;
determining a weight associated with the edge; and
calculating the recipient distance value based on the weight.

4. The computer-implemented method of claim 1, further comprising:
when the recipient item of hierarchical information is a determined outlier:
updating a graphical user interface that displays on a display device associated with the sender information indicative of a name of the recipient, with the updated graphical user interface causing the information indicative of the name of the recipient to change from a first color to a second color to notify the sender that the recipient is the unintended recipient.

5. The computer-implemented method of claim 1, further comprising:
when the recipient item of hierarchical information is not determined to be an outlier:
causing the electronic communication to be sent to the recipient.

6. The computer-implemented method of claim 1, wherein the hierarchical information comprises one or more of:
(i) a global address list;
(ii) Lightweight Directory Access Protocol information; and
(iii) a social network graph of a social networking platform, wherein a node in the social network graph represents the sender and wherein another node in the social network graph represents the recipient.

7. The computer-implemented method of claim 1, wherein the recipient distance value comprises a degree of separation value.

8. The computer-implemented method of claim 1, wherein the hierarchical information comprises one or more of:
information specifying an arrangement of nodes that specify users of a social networking platform and information specifying relationships among the nodes; and
information specifying an arrangement of nodes that represents employees of an entity and information specifying a hierarchy of the nodes.

9. The computer-implemented method of claim 1, wherein one of the one or more validation operations comprises:
determining whether information representing the recipient is included in a pre-approved recipient list.

10. The computer-implemented method of claim 1, wherein one of the one or more validation operations comprises:
determining whether information representing the recipient is included in a list that specifies entities to whom the sender previously sent electronic communications.

11. The computer-implemented method of claim 1, wherein notifying comprises:
causing a sender of the electronic communication to be prompted to confirm sending of the electronic communication to the recipient.

12. One or more machine-readable hardware storage devices storing instructions that are executable to cause one or more processing devices to perform operations comprising:
receiving information indicative of a request to send an electronic communication to a recipient;
executing one or more validation operations to determine whether the recipient is an intended recipient of the electronic communication by producing a validation score, wherein the validation score is a recipient distance value and at least one of the one or more validation operations comprises:
  accessing hierarchical information, with an item of hierarchical information representing an entity, with the hierarchical information representing relationships among entities, and with the recipient and a sender of the electronic communication being represented in the hierarchical information;
  identifying, in the accessed hierarchical information, a sender item of hierarchical information that represents the sender and a recipient item of hierarchical information that represents the recipient;
  calculating the recipient distance value between the sender item of hierarchical information that represents the sender and the recipient item of hierarchical information that represents the recipient;
  determining, based on the recipient distance value, whether the recipient item of hierarchical information is an outlier with an increased amount of distance to the sender item of hierarchical information, relative to other distances of other items of hierarchical information to the sender item of hierarchical information;
determining, based on comparison of the validation score to a threshold value, that the recipient is an unintended recipient of the electronic communication; and when detecting the recipient as an unintended recipient,
notifying the sender that the recipient is the unintended recipient of the electronic communication.

13. The one or more machine-readable hardware storage devices of claim 12, wherein determining whether the recipient item of hierarchical information is the outlier comprises:
  determining whether the recipient distance value exceeds a threshold distance value.

14. The one or more machine-readable hardware storage devices of claim 12, wherein the recipient distance value is a weighted value, and wherein the operations further comprise:
  identifying an edge in a graph between a node representing the user and a node representing the recipient;
  determining a weight associated with the edge; and
  calculating the recipient distance value based on the weight.

15. The one or more machine-readable hardware storage devices of claim 12, wherein the operations further comprise:
  when the recipient item of hierarchical information is a determined outlier:
    updating a graphical user interface that displays on a display device associated with the sender information indicative of a name of the recipient, with the updated graphical user interface causing the information indicative of the name of the recipient to change from a first color to a second color to notify the sender that the recipient is the unintended recipient.

16. The one or more machine-readable hardware storage devices of claim 12, wherein the operations further comprise:
  when the recipient item of hierarchical information is not determined to be an outlier:
    causing the electronic communication to be sent to the recipient.

17. The one or more machine-readable hardware storage devices of claim 12, wherein the hierarchical information comprises one or more of:
  (i) a global address list;
  (ii) Lightweight Directory Access Protocol information; and
  (iii) a social network graph of a social networking platform, wherein a node in the social network graph represents the sender and wherein another node in the social network graph represents the recipient.

18. The one or more machine-readable hardware storage devices of claim 12, wherein the recipient distance value comprises a degree of separation value.

19. The one or more machine-readable hardware storage devices of claim 12, wherein the hierarchical information comprises one or more of:
  information specifying an arrangement of nodes that specify users of a social networking platform and information specifying relationships among the nodes; and
  information specifying an arrangement of nodes that represents employees of an entity and information specifying a hierarchy of the nodes.

20. The one or more machine-readable hardware storage devices of claim 12, wherein one of the one or more validation operations comprises:
  determining whether information representing the recipient is included in a pre-approved recipient list.

21. The one or more machine-readable hardware storage devices of claim 12, wherein one of the one or more validation operations comprises:
  determining whether information representing the recipient is included in a list that specifies entities to whom the sender previously sent electronic communications.

22. A system comprising:
  one or more processing devices; and
  one or more machine-readable hardware storage devices storing instructions that are executable to cause the one or more processing devices to perform operations comprising:
    receiving information indicative of a request to send an electronic communication to a recipient;
    executing one or more validation operations to determine whether the recipient is an intended recipient of the electronic communication by producing a validation score, wherein the validation score is a recipient distance value and at least one of the one or more validation operations comprises:
      accessing hierarchical information, with an item of hierarchical information representing an entity, with the hierarchical information representing relationships among entities, and with the recipient and a sender of the electronic communication being represented in the hierarchical information;
      identifying, in the accessed hierarchical information, a sender item of hierarchical information that represents the sender and a recipient item of hierarchical information that represents the recipient;
      calculating the recipient distance value between the sender item of hierarchical information that represents the sender and the recipient item of hierarchical information that represents the recipient;
      determining, based on the recipient distance value, whether the recipient item of hierarchical information is an outlier with an increased amount of distance to the sender item of hierarchical information, relative to other distances of other items of hierarchical information to the sender item of hierarchical information;
    determining, based on comparison of the validation score to a threshold value, that the recipient is an unintended recipient of the electronic communication; and when detecting the recipient as an unintended recipient,
    notifying the sender that the recipient is the unintended recipient of the electronic communication.

23. The system of claim 22, wherein determining whether the recipient item of hierarchical information is the outlier comprises:
   determining whether the recipient distance value exceeds a threshold distance value.

24. The system of claim 22, wherein the recipient distance value is a weighted value, and wherein the operations further comprise:
   identifying an edge in a graph between a node representing the user and a node representing the recipient;
   determining a weight associated with the edge; and
   calculating the recipient distance value based on the weight.

25. The system of claim 22, wherein the operations further comprise:
   when the recipient item of hierarchical information is a determined outlier:
   updating a graphical user interface that displays on a display device associated with the sender information indicative of a name of the recipient, with the updated graphical user interface causing the information indicative of the name of the recipient to change from a first color to a second color to notify the sender that the recipient is the unintended recipient.

26. The system of claim 22, wherein the operations further comprise:
   when the recipient item of hierarchical information is not determined to be an outlier:
   causing the electronic communication to be sent to the recipient.

27. The system of claim 22, wherein the hierarchical information comprises one or more of:
   (i) a global address list;
   (ii) Lightweight Directory Access Protocol information; and
   (iii) a social network graph of a social networking platform, wherein a node in the social network graph represents the sender and wherein another node in the social network graph represents the recipient.

* * * * *